(12) United States Patent
Frederick et al.

(10) Patent No.: US 7,149,655 B2
(45) Date of Patent: Dec. 12, 2006

(54) METHODS AND APPARATUS FOR SAFETY CONTROLS IN INDUSTRIAL PROCESSES

(75) Inventors: Stanley Anthony Frederick, Morgan Hill, CA (US); Boris Leonid Sheikman, Morgan Hill, CA (US)

(73) Assignee: General Electric Company, Schenectady, NY (US)

( * ) Notice: Subject to any disclaimer, the term of this patent is extended or adjusted under 35 U.S.C. 154(b) by 217 days.

(21) Appl. No.: 10/880,734

(22) Filed: Jun. 30, 2004

(65) Prior Publication Data

US 2005/0283338 A1    Dec. 22, 2005

Related U.S. Application Data

(63) Continuation-in-part of application No. 10/872,205, filed on Jun. 18, 2004.

(51) Int. Cl.
*G06F 11/30* (2006.01)
(52) U.S. Cl. .................................. 702/182
(58) Field of Classification Search ............ 702/182, 702/81; 700/174
See application file for complete search history.

(56) References Cited

U.S. PATENT DOCUMENTS

| 4,584,165 A | 4/1986 | Wilson et al. | 376/216 |
| 4,957,690 A | 9/1990 | Fennern | 376/215 |
| 5,416,666 A * | 5/1995 | Maguire, Jr. | 361/681 |
| 6,650,722 B1 | 11/2003 | Steiner et al. | 376/217 |

* cited by examiner

*Primary Examiner*—Michael Nghiem
*Assistant Examiner*—Tung S. Lau
(74) *Attorney, Agent, or Firm*—Armstrong Teasdale LLP

(57) ABSTRACT

A safety instrument suitable for use in an industrial application includes a logic card having a microcontroller configured to perform self-test of the instrument and surveillance functions of an external system that is monitored and/or controlled by the instrument. The logic card also includes at least one complex programmable logic device (CPLD) configured to execute logic functions relating to human safety requirements of the external system independently of the microcontroller and to provide address decoding, input/output addressing, and/or registers for the microcontroller. The instrument further includes one or more I/O modules that are operatively coupled to the logic card to communicate monitor signals and/or control signals from the logic card to the external system.

18 Claims, 4 Drawing Sheets

METHODS AND APPARATUS FOR SAFETY CONTROLS IN INDUSTRIAL PROCESSES

CROSS REFERENCE TO RELATED APPLICATIONS

This application is a continuation-in-part of U.S. patent application Ser. No. 10/872,205 filed Jun. 18, 2004 to Gregory Scott Droba and Stanley Anthony Frederick, entitled "Software Based Control System for Nuclear Reactor Standby Liquid Control (SLC) Logic Processor," which is assigned to the assignee of the present Application and which is hereby incorporated by reference in its entirety.

BACKGROUND OF THE INVENTION

This invention relates generally to industrial safety systems and more generally to safety system architectures and operation methods.

Nuclear power generation systems require periodic surveillance be done to make sure that reactor systems are operating correctly. However, surveillance procedures for various analog safety systems require manual actuation by reactor personnel to test the systems and to obtain operability reports. Automation of manual surveillance functions for analog safety systems are not easily achieved. Moreover, it is difficult to scale such analog safety systems and provide standardization.

BRIEF DESCRIPTION OF THE INVENTION

Some configurations of the present invention therefore provide a safety instrument suitable for use in an industrial application. The instrument includes a logic card having a microcontroller configured to perform self-test of the instrument and surveillance functions of an external system that is monitored and/or controlled by the instrument. The logic card also includes at least one complex programmable logic device (CPLD) configured to execute logic functions relating to human safety requirements of the external system independently of the microcontroller and to provide address decoding, input/output addressing, and/or registers for the microcontroller. The instrument further includes one or more I/O modules that are operatively coupled to the logic card to communicate monitor signals and/or control signals from the logic card to the external system.

In other aspects, the present invention provides a method for providing safety features for an industrial plant. The method includes operating a microprocessor on a logic card to monitor and/or surveil an external system and operating a complex programmable logic device on the logic card independently of the microcontroller to execute logic functions relating to human safety requirements of the external system and to provide address decoding, input/output addressing, and/or registers for the microcontroller. The method further includes communicating monitor signals and/or control signals to the external system via one or more I/O modules.

Configurations of the present invention will thus be seen to readily provide automation of manual surveillance functions for analog safety systems, to scale easily, and provide advantageous standardization of components. Other advantages will become apparent to those skilled in the art upon reading the detailed description below.

DETAILED DESCRIPTION OF THE INVENTION

Figure 1:
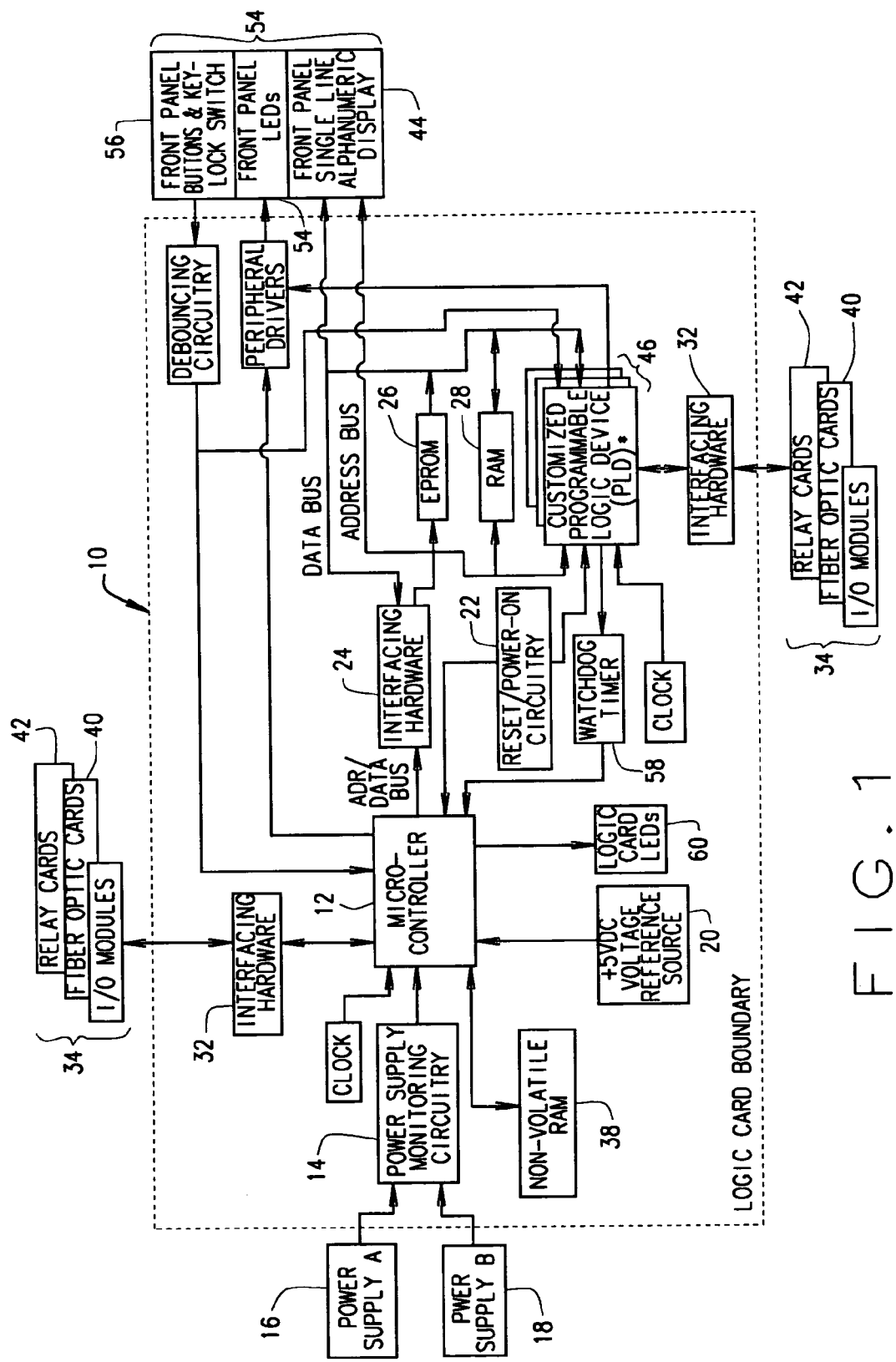
FIG. 1 is a block diagram representative of various configurations of a logic card of the present invention.

In some configurations, a microcontroller architecture suitable for use as a safety control in an industrial process is provided. Although this architecture is suitable for use in many industrial processes, it is particularly well-suited for use in nuclear power instrumentation and control systems. For example, the microcontroller architecture is suitable for use in Nuclear Measurement Analysis and Control (NU-MAC) modules, High Pressure Core Flooder (HPCF) control modules, Output Logic Unit (OLU) modules, and Standby Liquid Control (SLC) modules. These modules comprise a family of microcontroller-based chassis that employ configurations of the present invention. In various configurations, these instruments are modular and are also scalable via the addition of relays, fiber/optic communication links, input contact cards or other input/output (I/O) cards that can be inserted directly or indirectly on a logic board (motherboard) containing a microcontroller, firmware, customized logic (CPLD's), EPROM, NVRAM, RAM and various ICs. Some configurations of the present invention employ standardization for all removable modules so that like modules are interchangeable. All external connections and interfaces in some configurations are accommodated on the back of an instrument panel to enhance maintenance. Technical effects that are achieved by various configurations of the present invention include automation of manual surveillance functions for analog safety systems, easily scaled operation, and advantageous standardization of components, among others.

Instruments utilizing microprocessor architecture configurations of the present invention can be designed to fit standard 48.26 cm (19 in) width industrial racks and can be of a standard height, e.g., 13.335 cm (5.25 in) high. In some configurations of the present invention, redundant power supplies (e.g., two power supplies) are used to provide failsafe and robust electrical needs of the instrument utilizing the microprocessor architecture. Some configurations provide self test and surveillance methods for a particular application in microcontroller firmware. The microcontroller subsystem logic runs independently of logic contained in the CPLD subsystem and, in some configurations, an interface is provided between the microcontroller and the CPLDs that allows either subsystem to function in the event of a catastrophic failure in the other. When utilized in a plurality of instruments, configurations of the present invention provide a consistent user interface and feedback ("look and feel"). Also, each instrument can be secured from the front panel using, for example, a key-lock switch. Push buttons, LEDs and/or an alphanumeric display are also provided in some configurations of the present invention. New instruments can be scaled to meet specific customer and technical requirements. For example, devices to accommodate a particular communication protocol (i.e. MIL-STD-1553, RS-232, etc), relays designed to handle specific voltages and currents (i.e. 12VDC, 24VDC, 120VAC), and fiber optic cards designed to transmit and receive data at different wavelengths of light (i.e. 850 nm, 1300 nm) can be accommodated in various configurations of the present invention.

In some configurations of the present invention, instruments are rack-mountable for installation in standard instrument racks, e.g., 48.26 cm (19 in) instrument racks. For example, an instrument chassis in some configurations of the present invention is 48.26 cm (19 in) wide, 13.335 cm (5.25 in) high, and between 30.48 cm to 35.56 cm (12 in to 14 in) deep. Each instrument chassis can include a front panel display, dual redundant power supplies, a logic card, and I/O cards suitable for the intended application of the instrument. Like modules are directly interchangeable between instruments, both electrically and mechanically, and do not require any calibration upon exchange.

In some configurations of the present invention and referring to FIG. 1, a logic card 10 provides instrument logic and control, status communication to external systems (i.e., systems external to the instrument in which logic card 10 is contained), and operator display and keyboard control. Some configurations of logic card 10 include the following components:

Microcontroller

Microcontroller 12 is provided to handle high-speed calculations and fast input/output operations. An example of a suitable microcontroller is the 87C196KD microcontroller, a 16-bit CHMOS processor available from Intel Corporation, Santa Clara, Calif. Features of this microcontroller useful for configurations of the present invention include 20 MHz clocking, 1 kilobyte register RAM, a full duplex serial port, five 8-bit I/O ports, four internal 16-bit timers, and a 10-bit A/D converter with an input MUX.

Functional operation on the logic card is monitored by microcontroller 10. Microcontroller 10 transmits asynchronous serial status messages which can be used for surveillance purposes, provides keyboard and display control, and monitors digital I/O lines. In addition to these functions, the microcontroller performs start-up and on-line self-testing by monitoring power supply and external sensor voltages and by checking memory integrity. Communication messages transmitted can be looped back for validation by self-test.

Microcontroller Supervisor

Microprocessor supervisor logic includes power supply monitoring circuitry 14 that monitors +5 VDC power for logic card 10 and I/O modules 34 that is supplied from redundant power supplies 16 and 18 and generates a reset for microcontroller 12 when the voltage is between +4.50 to 4.60 VDC. This reset also clears CPLD control logic 46 to an initialized state. A +5 VDC voltage reference source 20 and reset/power-on circuitry 22 are also provided as part of the microprocessor supervisory logic.

One or more Complex Programmable Logic Devices (CPLDs) 46 are provided in addition to microcontroller 12 to perform control and decoding and/or provide functional logic.

Control and Decoding Hardware

In some configurations of the present invention, control and decoding hardware includes or consists essentially of a Complex Programmable Logic Device or Devices (CPLDs) 46 that are configured to provide one or more of:

1. Address decoding for EPROM 26 and RAM 28 and all memory mapped I/O functions;

2. Address decoding for various logic status registers; and

3. Wait-state generator control on microcontroller 12 for slower peripheral access (for example, front panel LED displays 30 require 3 wait states in some configurations for a read or write access).

Functional Logic Interface Hardware

In some configurations of the present invention, functional logic interface hardware includes or consist essentially of a Complex Programmable Logic Device or Devices (CPLDs) that are configured to provide at least one of:

1. Various frequency dividers;

2. Functional logic that monitors trip status and I/O and can generate trip commands and other control commands;

3. Support logic for various communication protocols; and

4. Support for external interface cards 34 and other glue logic.

Configurations of logic card 10 can accommodate a plurality of CPLDs 46 (e.g., up to 3 on one card in some configurations), and CPLDs may be socketed for easy servicing, replacement, or reconfiguration. The control and decoding hardware and the functional logic interface hardware can thus be contained within a single CPLD, two separate CPLDs, spread across two or more CPLDs, etc. The invention does not require a one-to-one correspondence between the control and decoding hardware and the functional logic interface hardware on the one hand and individual CPLDs on the other.

Input Power Protection and Analog Reference

The following power input lines on the control card are protected by auto-resetting thermal current limiting devices (not separately shown in FIG. 1): +5 VDC, +5VDC front panel, +5VDC fiber optic, +5VDC relay cards A & B, +24 VDC and +48 VDC These devices heat up when the current limit is reached and open-circuit until the over-current condition is corrected. The input power lines are monitored by microcontroller 12 during self-test using power supply monitoring circuitry 14. The result of this test for each measurement is combined to control a Power Fault LED (included in LEDs 30) displayed on the front panel. In some configurations, power supply voltages are accessible for measurement at test points on a rear panel of an instrument comprising logic card 10.

A +5 VDC reference 20 needed for microcontroller 10 A/D converter is produced from the +24VDC input power and is monitored by an under/over voltage detection circuit.

EPROM and RAM Memory

In some configurations, an EPROM 26 is provided for non-volatile program storage. A 32 Kbyte EPROM can be provided for this purpose. Static RAM 28, for example, an 8 Kbyte static RAM, is provided in some configurations as high speed Read/Write memory for use by microcontroller 12.

Nonvolatile RAM

A nonvolatile RAM 38 such as a 2K×8 bit ferroelectric RAM is provided in some configurations for storage of application parameters that should not be lost when power is removed. These parameters depend upon the application in which card 10 is utilized, but a non-exhaustive list of possible application parameters that can be stored in non-volatile RAM 38 can include self-test error codes and counts, calibration parameters, and the like. RAM 38 in some configurations is a serial device with low power consumption and very high write endurance characteristics.

Fiber Optic Interface Card

Fiber Optic Interface Cards 40 provide conversion between optical and electrical signals. In some configurations of the present invention, each card includes 6 physical channels. These channels can be used for transmitting, receiving, or bi-directional communication, depending upon the application of card 10. For example, each channel can operate with fiber optic signals having a peak sensitivity wavelength of 850 nm although some configurations use other wavelengths, for example, 1300 nm. Optical transmitters and receivers mate to standard ST type optical connectors in some configurations.

Relay I/O Cards

In many applications, one or more relay I/O cards 42 are provided. I/O card 42 may include, for example, mechanical latching relays, non-latching relays, contact closure sensing circuits, or any combination thereof. Each I/O card 42 is configured as an interface buffer between logic card 10 and other devices being controlled ("the outside world," as seen from the viewpoint of logic card 10). High voltage signals coming into the chassis are translated to standard TTL levels. Standard TTL level signals are sent to these cards, in many instances to switch the much higher voltages that are used by external systems.

Fiber optic interface cards 40 and relay I/O cards 42 permit control and/or sensing and surveillance of an external system (for example, and without limitation, valves, pumps, or other instruments) while providing electrical isolation between the external system and components on logic card 10. In this manner, logic card 10 is less subject to failures resulting from electrical disturbances in the external system or communication lines between the safety instrumentation and the external system. Interfacing hardware 32 is provided in some configurations to interface between microcontroller 12 and/or CPLDs 46 and any interface cards 34 present in an instrument.

Figure 2:
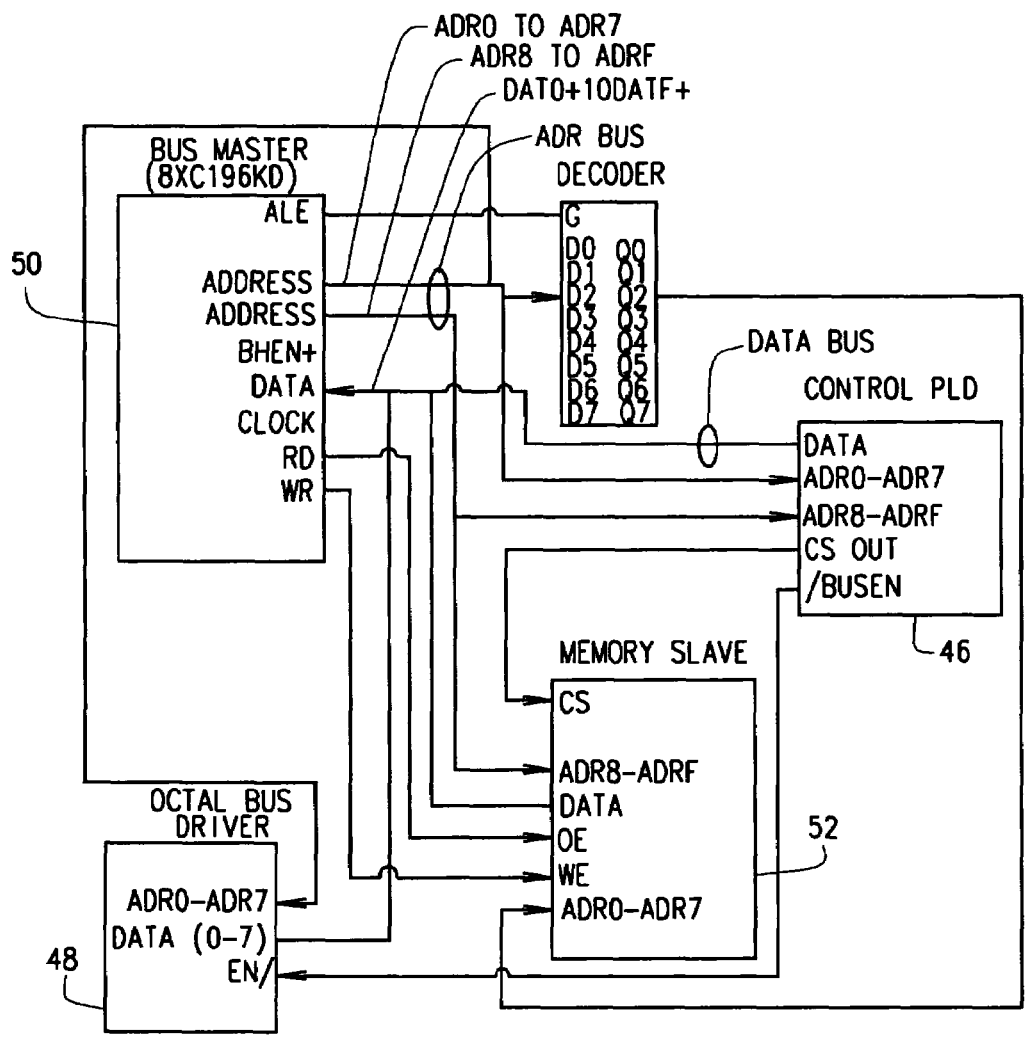
FIG. 2 is a schematic diagram representative of one suitable bus configuration of the logic card of FIG. 1.

Whether using external logic or a CPLD, some configurations of the present invention employ a bus that supplies an interface for up to four I/O cards 34, front panel displays 30 and/or 44, EPROM 26, RAM 28, and one to three Custom Programmable Logic Devices CPLDs 46. A portion of a suitable bus configuration is shown in FIG. 2 and includes, among other things, an address bus (ADR BUS) and a data bus (DATA BUS), sometimes referred to collectively herein as an address/data bus (ADDR/DATA BUS). The bus structure carries signals to allow components to interact with each other and to allow memory and I/O data transfers, direct memory accesses, and other functions. The bus structure is a variation of a "master-slave" configuration in which a master device 50 takes control of the bus and a slave device (for example, slave device 52), upon decoding its address, acts upon a command provided by the master device.

In some configurations, a 8XC196KD device (available from Intel Corporation, Santa Clara, Calif.) acts as BUS master 50. It sends an Address Latch Enable (ALE) signal to an external latch to demultiplex an address from the address/data bus. This signal is used for external memory (e.g., RAM 28 and EPROM26) and is used to decode the lower eight address signals. Other peripheral devices are addressed and controlled via a combination of a CPLD 46 and one or more octal BUS drivers 48. CPLD 46 decodes the upper 8 address lines and will issue an ENABLED signal to the correct octal BUS Driver 48, allowing a peripheral device to be addressed using the lower 8 address lines. Signals transferred over the bus can be grouped into several classes based on the functions they perform. The classes comprise control signals, address and inhibit signals, and data signals.

Surveillance Capabilities

In some configurations of the present invention, self test status and reporting features are provided to supports enhanced surveillance capabilities. In addition, power supply voltages are made available at a back panel of an instrument that includes logic card 10. Software or firmware running, for example, in microcontroller 12 tests and reports voltage over and under bus conditions. The voltage of each monitored power supply can be measured by a DVM directly from the back of the panel in some configurations.

In various configurations of the present invention, microcontroller 12 and CPLDs 46 run as two separate subsystems in parallel. By appropriately partioning safety related logic and glue logic into the CPLDs, a catastrophic failure in any one subsystem need not affect any other subsystem. For example, a set of address/data latches, multiplexors, demultiplexors, and interrupt controllers used by microcontroller 12 be programmed into a first CPLD 46. Another CPLD 46 (or set of CPLDs) can be programmed to contain logic necessary to implement functionality of the instrument in which logic card 10 is contained, thereby advantageously providing flexibility in configuring operation of the instrument. Hundreds of registers and address decoders can be added (up to the physical limit of CPLDs 46) for use by microcontroller 12. A CPLD 46 that defines the operation of the instrument in which logic card 10 is contained can readily be tailored for future plant applications. For example, I/O lines, timers, waveform generators, and various state machines can readily be added. Glue logic for microcontroller 12 (in a CPLD 46 or elsewhere) provides buffering between the microcontroller logic subsystem 12 and CPLD logic subsystem 46. As long as the buffering CPLD 46 is operating normally in such configurations, a catastrophic failure of logic in microcontroller 12 will not affect the performance of instrument logic card 10. This separation allows instrument logic card 10 to operate and interface with other equipment that may have a different safety classification. For example, CPLDs 46 can perform a safety related function for which human lives are dependant on its operation and software or firmware in EPROM 26 and/or RAM 28 can be provided to instruct microcontroller 12 to perform non-safety functions that have no capacity to jeopardize human life. Alternately, CPLDs 46 can perform non-safety related functions and microcontroller 12 in conjunction with EPROM 26 and/or RAM 28 can perform the safety-related function. CPLDs 46 and microcontroller 12 can also be configured to cooperatively perform selected functions. Front panel indicators 30 and/or 44 are controlled by logic card 10 and provide a user with information about an external system (e.g., valve or pump status or external sensors providing input to the instrument) being monitored and/or controlled by an instrument comprising logic card 10.

Figure 3:
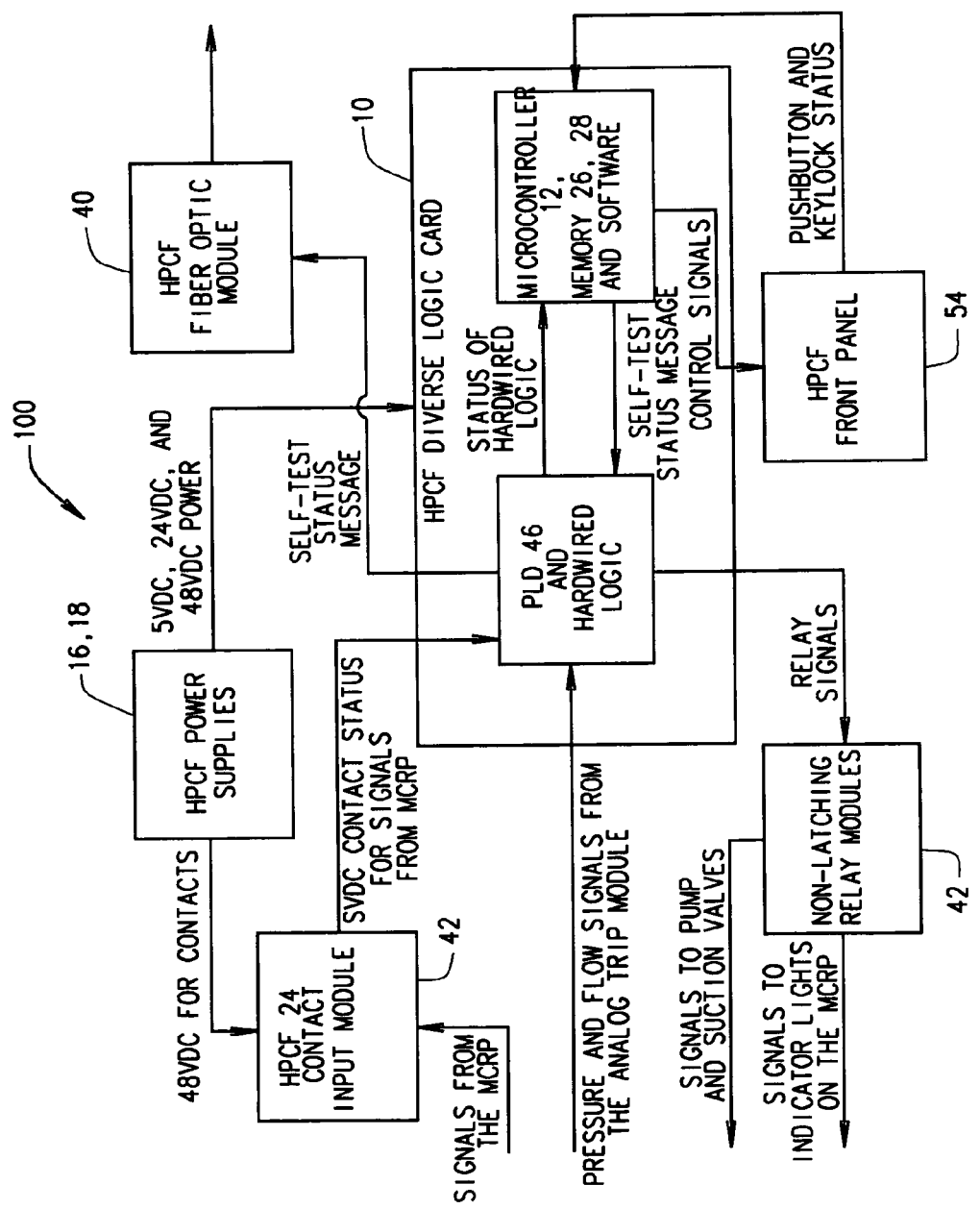
FIG. 3 is a block diagram representative of a safety control instrument (in this case, a High Pressure Core Flooder) comprising a logic card configuration as represented in FIG. 1.

As discussed above, logic card 10 can be used in many different types of instruments (e.g., OLU, SLC, HPCF) and is particularly suitable for a plurality of safety systems in nuclear power generation plants. For example, in one configuration of a High Pressure Core Flooder (HPCF) system, water is injected into a reactor vessel through two 100% capacity loops (i.e., Loop B and Loop C), located in two separate divisions. Referring to FIG. 3, a logic card 10 configured as an HPCF Diverse Logic Processor 100 is used in the HPCF system to act upon Loop C via manual initiation. In the case of a four division common-cause failure of four normal HPCF systems, the manual initiation of Loop C through the HPCF Diverse Logic Processor can occur independently of all other Engineered Safety Function (ESF) logic. Once initiated, HPCF Diverse Logic Processor 100 automatically controls the necessary valves and pumps to prevent a loss of coolant accident (ALOCA). HPCF Diverse Logic Processor 100 uses hardware-based logic (including microcontroller 12 and CPLDs 46) to perform control functions as well as software in a passive mode to monitor and report the status of HPCF Diverse Logic Processor 100 to automate surveillance activity. HPCF Diverse Logic Processor 100 is a back-up system for a back-up system. In the event that all of the regular HPCF systems fail (i.e., all four such systems in some configurations), HPCF Diverse Logic Processor 100 is available as a further back-up. Should a common-mode design flaw ever occur in the regular HPCF systems, HPCF Diverse Logic Processor 100 is still likely to remain available because it has been designed using independent tools and technology. Logic card 10 in HPCF Diverse Logic Processor 100 has a modular design and can be configured to provide automatic notification of an instrument failure to an operator. Self-test software and hardware functions are provided in some configurations to allow for faults to be identified at the module level. For this reason, various configurations of HPCF Diverse Logic Processor 100 can be repaired promptly (e.g., within 30 minutes) by replacement of modules.

HPCF Diverse Logic Processor instrument 100 is a member of the NUMAC family and uses logic card 10, including CPLDs 46, microcontroller 12, and software/firmware programming. Some embodiments are configured to process manual start/stop signals from the Main Control Room Panel for HPCF Loop C to fulfill the "defense-in-depth" and diversity requirements for this system. Some configurations also provide self-test and status diagnostics which are displayed on the front panel (see FIG. 4) of the instrument and sent to the Reactor Trip and Isolation Function (RTIF) Communications Interface Module (CIM). In some configurations, safety-related functions are performed by hardwired logic (CPLDs 46) in HPCF Diverse Logic Processor 100. Software monitors these functions via self-test diagnostics and sends status messages to the CIM via a fiber optic module 40. Software also controls the LEDs 30 and alphanumeric display 44 on front panel 54 of the chassis and directly responds to the front panel pushbuttons and keylock switches 56. In some configurations, the hardwired functions of the HPCF Diverse Logic Processor include receiving signals from the Main Control Room Panel (MCRP) via a 24 Contact Input Module 42 and controlling indicator lights on the MCRP, the pump, and valves via a Non-Latching Relay Control Module 42.

A Contact Input Module 42 (for example, a 24 Contact Input Module in some configurations) interfaces with the MCRP, where an operator can control HPCF Diverse Logic Processor 100 using various switches and pushbuttons. Contact Input Module 42 also receives status signals from the pump and suction valves.

In some configurations of the present invention, fiber optic modules 40 include at least a transmitter. Fiber optic modules 40 provide a communication link between HPCF Diverse Logic Processor 100 and the Reactor Trip and Isolation Function (RTIF) Communication Interface Module (CIM).

Figure 4:
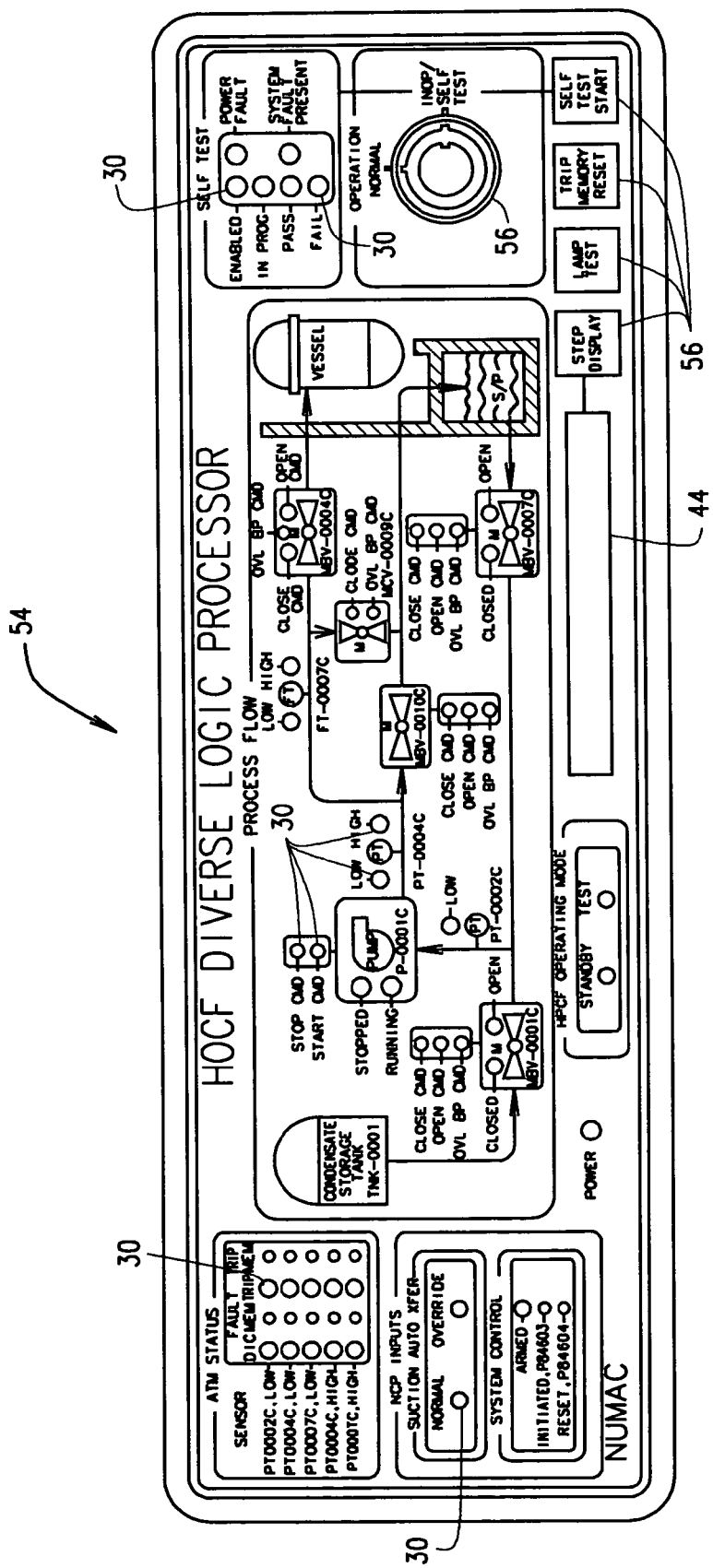
FIG. 4 is a pictorial diagram representative of a front panel of an instrument configuration represented by FIG. 3.

In some configurations and referring to FIG. 4, an HPCF Front Panel assembly provides a local interface 54 between the operator and the HPCF Diverse Logic Processor. The HPCF Front Panel assembly includes pushbuttons and a keylock switch 56 that allows an operator to initiate a self-test and to monitor the status of the HPCF Diverse Logic Processor and the HPCF Loop C system. LEDs 30 and display 44 on the front panel indicate the status of ATM signals, MCRP signals, relays, self-test results, and the operating mode of the HPCF Diverse Logic Processor.

Two Non-Latching Relay Modules 42 each contain 18 mechanical non-latching relays and two solid-state relays. The non-latching relay contacts are used to control the pump starting and stopping functions as well as the valve opening, closing, and bypass functions. Solid-state relays are used to drive the indicator lights located on the Main Control Room Panel (MCRP).

HPCF Diverse Logic Processor logic card 10 provides the logic processing, monitoring and communication functions for the HPCF Diverse Logic Processor. This module includes microcontroller 10, memory 38, 26, and 28, CPLDs 46, and interface logic. It receives signals from input modules 34 indicating the status of the MCRP signals and it receives the pressure and flow signals. It controls the relays on Non-Latching Relay Modules 42 and interfaces with fiber optic modules 40 to transmit messages to the RTIF CIM. A microcontroller supervisor is provided in the form of a power supply monitoring circuit 14 that generates a reset signal if the input voltage from power supplies 16 and/or 18 are out of range. Monitoring circuit 14 in some configurations also resets CPLD 46 logic to its initialized state. A watchdog timer 58 times out if the microcontroller fails to send out a strobe signal within a predetermined period of time, for example, 1.12 seconds. Watchdog timer 58 in some configurations is electrically connected to the non-maskable interrupt (NMI) of microcontroller 12 so that expiration of watchdog timer 58 generates an NMI to microcontroller 12, causing a warm reboot. The watchdog timer does not reset the CPLD 46 logic, however.

In some configurations CPLDs 46 comprise complex, 560 macro-cell, Programmable Logic Devices (PLD) that are configured to provide: a) address decoding for EPROM 26 and RAM 28 memory devices and all memory mapped I/O functions; b) wait-state generator control on microcontroller 12 for slower peripheral access (front panel LED displays 30 and the twenty-four contact input card require two wait states in some configurations for a read or write access); c) addressable ports and registers that enable microcontroller 12 to access the status of input signals, output control, PLD revision and relay status; d) five output ports that interface with relay driver components; e) one output port that interfaces with a front panel display card; f) a 12 MHz to 1 MHz clock generator; and g) all functional logic for the HPCF Diverse Logic Processor to 1) monitor the ATM trip status and contact input switch status, 2) process the contact inputs, and 3) generate pump and valve control commands.

Power input lines on the HPCF Diverse Logic Module are protected by auto-resetting thermal current limiting devices that heat up when the current limit is reached and open-circuit until the over-current condition is corrected.

A 32-kilobyte EPROM 26 provides non-volatile storage for software in some configurations. In some configurations, all software is stored as firmware in non-volatile memory, so that software changes are performed by EPROM replacement. An 8-kilobyte static RAM 28 provides high-speed read/write memory required by the microcontroller 12 in some configurations. A non-volatile 2Kx8 ferroelectric RAM 38 provided in some configurations provides storage for application parameters that should not be lost when power is removed. This RAM is a serial device with low power consumption and very high write endurance characteristics. A four wire serial interface through Port 1 of the microcontroller provides access to any byte within the memory device. Examples of variables to store in NVRAM 38 include, but are not limited to: 1) cold boot counter; 2)

warm boot counter; 3) watchdog counter; 4) power supply voltage readings and settings; 5) error codes; and 6) self-test status.

LEDS 60 are provided on logic card 10 itself to provide test and/or fault indications. Various test and monitoring points are also provided at which voltages and timing can be observed if necessary.

HPDC Diverse Logic Processor 100 includes logic card 10 interfaces to numerous electrical signals through connectors located on the back of its chassis, including a fiber optic output. Electrical inputs include contact closures on the main control room panel and on various pumps, flow meters, and pressure transducers. There are also several electrical contact inputs located on the front panel of the chassis. These inputs include pushbuttons and key-lock switch or switches 56.

It will thus be appreciated that an HPDC Diverse Logic Processor 100 utilizing logic card 10 provides various advantages including the employment of standardization for all removable modules so that like modules are interchangeable. External connections and interfaces are accommodated on the back of an instrument panel to enhance maintenance in some configurations. Redundant power supplies (e.g., two power supplies) are used to provide failsafe and robust electrical needs of the instrument. Self test and surveillance methods can be included in microcontroller firmware. The microcontroller system runs independently of logic contained in the CPLD and either subsystem can function in the event of a catastrophic failure in the other. The HPDC Diverse Logic Processor can be secured from the front panel using a key-lock switch. Like modules are directly interchangeable between instruments, both electrically and mechanically, and do not require any calibration upon exchange.

While the invention has been described in terms of various specific embodiments, those skilled in the art will recognize that the invention can be practiced with modification within the spirit and scope of the claims.

What is claimed is:

1. A safety instrument suitable for use in an industrial application, said instrument comprising:
    a logic card including a microcontroller configured to perform self-test of said instrument and surveillance functions of an external system at least one of monitored or controlled by the instrument, and at least one complex programmable logic device (CPLD) configured to execute logic functions relating to human safety requirements of said external system independently of said microcontroller and to provide at least one of address decoding, input/output addressing, or registers for said microcontroller;
    one or more I/O modules operatively coupled to said logic card to communicate at least one of monitor signals or control signals from the logic card to the external system; and
    non-volatile RAM, and said microcontroller configured to store time-stamped error data in said non-volatile RAM.

2. An instrument in accordance with claim 1 further comprising redundant power supplies configured to provide power to said logic card and I/O modules.

3. An instrument in accordance with claim 1 further comprising a front panel having indicators controlled by said logic card, said indicators configured to provide a user of said safety instrument with information relating to said external system.

4. An instrument in accordance with claim 1 further comprising a rear panel wherein power supply voltages are provided for measurement.

5. An instrument in accordance with claim 1 wherein said time-stamped error data is related to said self-test and surveillance functions.

6. An instrument in accordance with claim 1 further comprising a plurality of relays including latching relays.

7. An instrument in accordance with claim 1 further comprising at least one fiber optic interface card configured to communicate signals between said external system and at least one of said microcontroller or said CPLD and to provide electrical isolation therebetween.

8. A safety instrument in accordance with claim 1
    wherein said safety instrument is installed in a nuclear power plant.

9. An instrument in accordance with claim 8 configured as a diverse high pressure core flooder logic unit.

10. A method for providing safety features for an industrial plant, said method comprising:
    operating a microprocessor on a logic card to at least one of monitor or surveil an external system;
    operating a complex programmable logic device on the logic card independently of the microcontroller to execute logic functions relating to human safety requirements of the external system and to provide at least one of address decoding, input/output addressing, or registers for said microcontroller;
    using the microcontroller to store time-stamped error data in a non-volatile RAM on the logic board; and
    communicating at least one of monitor signals or control signals to the external system via one or more I/O modules.

11. An method in accordance with claim 10 further comprising power to said logic card and I/O modules using redundant power supplies.

12. An method in accordance with claim 10 further comprising controlling front panel indicators using the logic card, said indicators configured to provide a user of said safety instrument with information relating to said external system.

13. A method in accordance with claim 10 further comprising providing power supply voltages at a rear panel for measurement.

14. A method in accordance with claim 10 wherein said time-stamped error data is related to said self-test and surveillance functions.

15. A method in accordance with claim 10 further comprising operating a plurality of relays including latching relays to communicating at least one of monitor signals or control signals to the external system.

16. A method in accordance with claim 10 further comprising communicating signals between said external system and at least one of said microcontroller or said CPLD via at least one fiber optic interface card configured to provide electrical isolation therebetween.

17. A method in accordance with claim 10 performed in a nuclear power plant.

18. A method in accordance with claim 17 wherein said logic functions relating to human safety comprise operations relating to flooding a core of the nuclear power plant.

* * * * *